United States Patent Office 3,795,719
Patented Mar. 5, 1974

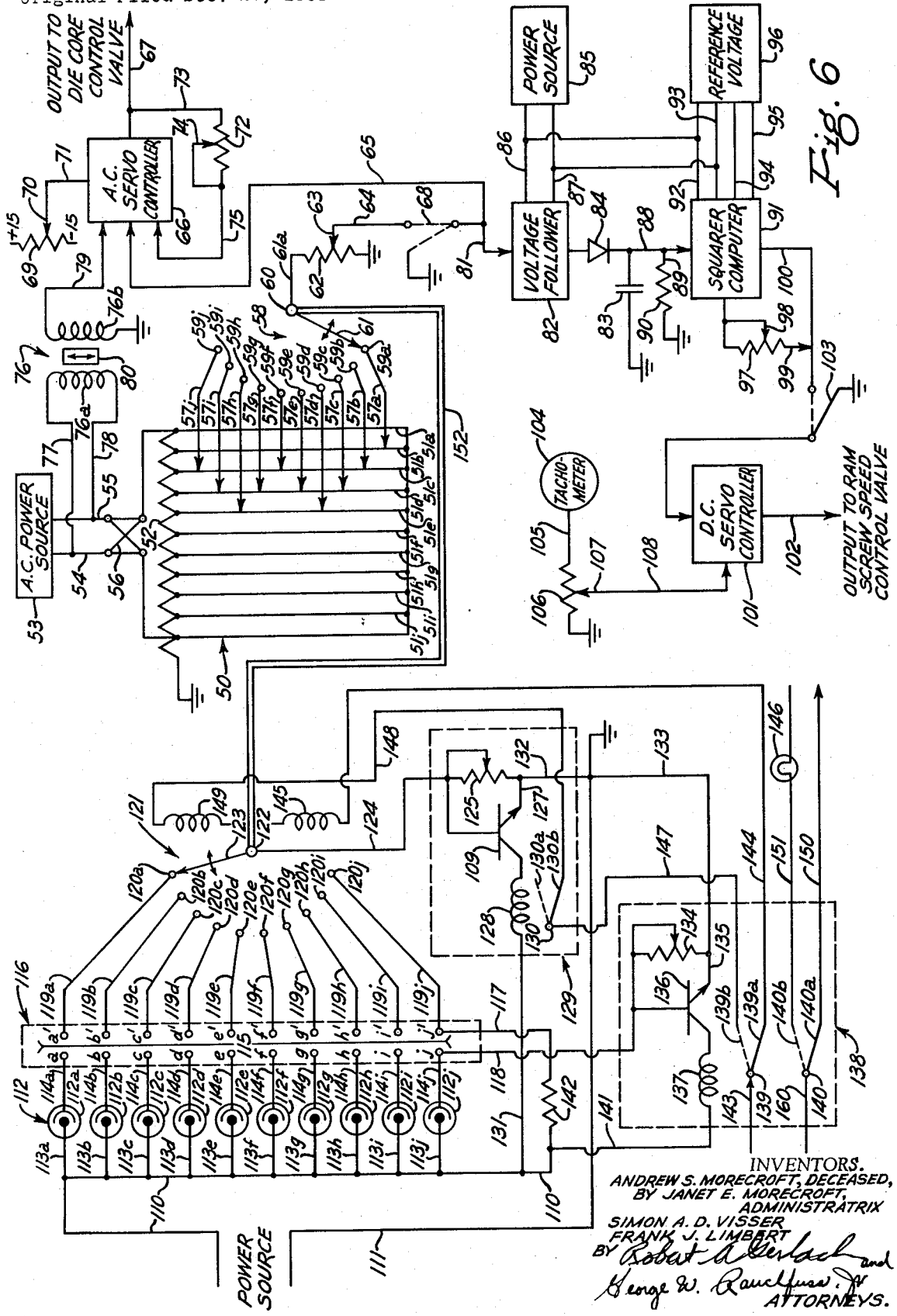

3,795,719
METHOD OF CONTROLLING THE BLOW MOLD-ING OF HOLLOW SHAPED PLASTIC ARTICLES
Andrew S. Morecroft, deceased, by Janet E. Morecroft, administratrix, Bridgeville, and Simon A. D. Visser, Braddock, and Frank J. Limbert, Pittsburgh, Pa.; said Limbert and said Visser assignors to Baychem Corporation, New York, N.Y.
Continuation of abandoned application Ser. No. 785,810, Dec. 20, 1968. This application Sept. 9, 1971, Ser. No. 228,407
Int. Cl. B29c *17/07;* B29d *23/04*
U.S. Cl. 264—40                                      3 Claims

ABSTRACT OF THE DISCLOSURE

An extrusion method for molding plastic articles of either constant or variable wall cross-sections. Electronic control circuitry is adapted to control the movement of a movable die core and the speed of the axial movement of a rotatable ram screw whereby articles of constant or variable wall cross-section are molded under substantially constant rheological conditions. A plurality of photocells and a programmable function generator are utilized to systematically energize the components of the electronic control circuitry.

EXTRUSION APPARATUS AND METHOD OF MOLDING

This is a continuation of application Ser. No. 785,810 filed Dec. 20, 1968, and now abandoned.

This invention relates to improved extrusion method and more particularly to an improved extrusion method for blow molding a parison of plastic material of constant or variable wall cross-section under substantially constant rheological conditions.

Blow molding is a processing operation in which thin-walled, hollow articles are formed by extruding a parison of a molten thermoplastic material between two mold halves, then closing and clamping the parison between the two mold halves such that the top and bottom openings of the parison are sealed except for a small blow pipe which extends into the cavity of the parison. Air is blown into this cavity to expand the parison to conform to the contours of the mold halves. The mold is cooled to lower the temperature of the thermoplastic material below its glass-transition point. The mold is cooled, opened and the formed article is removed. It has long been recognized that in order to obtain an acceptable molded article by such a processing technique, it is necessary to vary the thickness of the walls of the parison to compensate for the varying degrees of expansion of the parison required to permit the parison to conform to the walls of the mold. Extrusion apparatus to permit extrusion of parisons of variable wall thickness have heretofore been known. For example, the extrusion apparatus disclosed in U.S. Pat. 3,019,481 includes a variable orifice with an associated movable and positionable core. Generally, a rotating ram screw in the extrusion apparatus plastifies a thermoplastic material in a heated barrel. When the die core is closed with respect to the orifice, the pumping action of the ram screw fills the cavity between the screw and the die with molten material and simultaneously pushes the screw backwards. To extrude the parison, the screw rotation is stopped, the die core opened and the whole screw-gear box-motor assembly is moved forward by means of a suitable driving means and the plastic material is thereby permitted to flow around the die core and through the orifice to form a parison of molten plastic material. The orifice and the associated die core are constructed and arranged so that the thickness of the walls of the parison may be varied by varying the position of the die core with respect to the orifice during the extrusion process to provide blown articles having walls of more uniform thickness. The die core is positioned to permit more plastic material to flow through the orifice to form those portions of the parison which are to be expanded the most. The thicker portions of the parison generally form those portions of the molded article walls having the largest dimensions. Hence, walls of more uniform thickness are obtained.

It has been proposed heretofore to control the movement of the die core by means of a cam. However, such proposed means of controlling the movement of the die core was found to be unacceptable for numerous reasons among which there may be mentioned the following. The main disadvantage is that such a cam control is usually governed by the parison section weight and thus the shape of the cam has no direct relationship to the shape of the parison. Additionally, the cam usually has only a very short controlling traject and it is very inconvenient, if not entirely impossible, to make alterations on the cam, particularly while the extruder is in operation.

Recently it has been proposed to provide selectively variable control of the thickness of the walls of a parison throughout its length to assure that the article being molded has a desirable optimum and variable selectable thickness. In U.S. Pat. No. 3,368,241 it is proposed to accomplish this by the use of a variable function generator programmed to the desired wall thickness of the article to be molded. The use of the apparatus disclosed in the aforesaid patent has not proved entirely successful, however, for a number of reasons. In the proposed apparatus the variable function generator is actuated by a rotary switch driven directly from the main shaft of the molding machine by a suitable cogged timing belt and timing pulleys. The generation of the controlling signal is thus not controlled by the parison itself but by the molding machine shaft. Such an arrangement is highly undesirable since the proper controlling signals are not necessarily actuated at the most desirable points in the extrusion of the parison. Furthermore, such a system is without any means of controlling the volumetric rate of extrusion relative to the shape of the parison. Although some degree of wall control thickness of the parison is obtained by means of varying the die opening with the heretofore proposed apparatus system, melt fracture occurs in many situations, particularly where the die opening is small, since the volumetric rate of extrusion is not varied. For every extrusion temperature there is a certain shear rate above which melt fracture occurs. This first shows as a haze on the surface of the extrudate, then as a rippling on the surface, and in more severe cases the extrudate will fracture completely. Melt fracture thus occurs in the heretofore proposed apparatus since the speed at which the plastic moves through the die opening and orifice will vary widely when different parison wall thicknesses are extruded through a die with different annular openings thus producing widely varying shear rates. Furthermore, another disadvantage of the heretofore known apparatus systems is the absence of any suitable termination of the extrusion step controlled by the extrusion of the parison itself.

It is, therefore, an object of this invention to provide an improved method utilizing apparatus for molding plastic articles of either constant or variable wall cross-section which is devoid of the problems and disadvantages set forth hereinabove. A further object of this invention is to provide a method utilizing an extrusion apparatus and control circuit associated therewith wherein control of the movement of the die core is coupled to control of the rate of extrusion as determined by the speed of the axial movement of a rotatable ram screw. An additional object of this invention is to provide a method utilizing control apparatus for molding plastic articles, which apparatus provides for the proper generation of timely controlling signals. A further additional object of this invention is to provide a process for molding plastic articles which permits wall thickness control over the entire length of the parison and simultaneous control of the extrusion speed such that the extrusion of plastic material takes place under substantially constant rheological conditions. A still further object of this invention is to provide a method for the blow molding of plastic articles wherein generation of the control signals for controlling the die core movement and the speed of the axial movement of the ram screw is governed by the parison itself. Yet another object of this invention is to provide a process for extruding plastic articles which permits the extrusion of plastic materials that have a tendency toward sagging. It is a still further object of this invention to provide an extrusion method for molding plastic articles wherein the extrusion of the parison itself controls the end of the extrusion step. Still another object of this invention is to provide a process for molding plastic articles of either constant or variable wall cross-section which includes electronically controlled circuitry adapted to simultaneously control the movement of a movable die core and the axial movement of a rotatable ram screw whereby articles of constant or variable wall cross-section are molded under substantially constant rheological conditions.

The foregoing objects and others which will become apparent from the following description and the accompanying drawings in which:

FIG. 6 is a schematic diagram of the control circuit of this invention; and

are accomplished in accordance with this invention, generally speaking, by providing an extrusion apparatus in which the generation of the control signal at the proper time and place is governed by the parison itself and wherein the die core control means and the ram screw axial movement speed control means are coupled together such that the ram screw axial movement speed control means receives an input signal proportional to the square of the die core control means input signal whereby extrusion takes place under substantially constant rheological conditions for every wall thickness of the parison extruded. More particularly, the objects of this invention are accomplished by an extrusion apparatus in which the generation of the control signal at the proper time and place is governed by a dropping parison sequentially deactivating a plurality of photocells arranged to sequentially generate singals from a programmable function generator wherein the die core control means and the ram screw axial movement speed control means are coupled together such that the ram screw axial movement speed control means receives an input signal proportional to the square of the die core control means input signal whereby extrusion takes place under substantially constant rheological conditions for every wall thickness of the parison extrusion and wherein one of said plurality of photocells may further be adapted to terminate the extrusion step.

Figure 1:
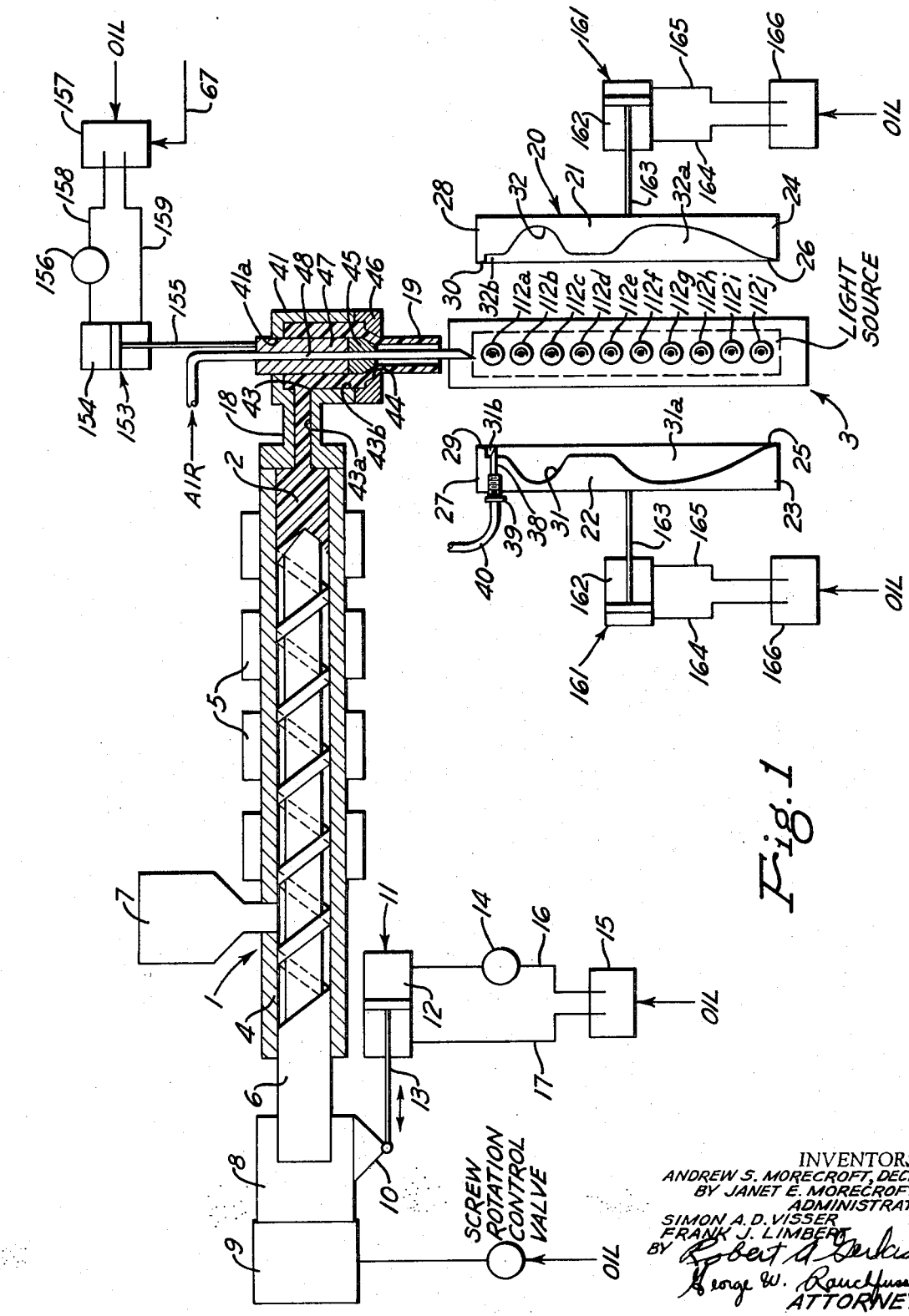
FIG. 1 is an elevational view, partially in cross-section, of an extruder and blow molding apparatus associated therewith.

Since the general type of molding machine with which the present invention is concerned is well known in the art, a complete description thereof need not be recited herein. It will be recognized from the following description and the foregoing drawings, that the control apparatus of this invention will be adaptable for use with any suitable molding machine. In FIG. 1 there is indicated generally an extruder 1 for plastifying a plastic material 2 and wherein said extruder 1 is suitably mounted in cooperating relationship with a mold assembly indicated generally by 3. Since the specific construction of the extruder and the mold assembly do not per se form a primary critical aspect of the invention, they will be described only generally. The extruder 1 includes a barrel section 4 heated by any suitable heating means 5 such as, for example, oil or electric heaters, having an axially moving rotatable ram screw 6 disposed therein to plastify a thermoplastic material 2 fed to the barrel section 4 of the extruder 1 through any suitable material feed means 7 such as, for example, a hopper. The axially moving rotatable ram screw 6 is driven by any suitable driving means such as a motor 8, a gear box 9 and a ram 10 adapted to be driven by any suitable driving means 11 such as a hydraulic cylinder 12 and piston 13. The action of the hydraulic cylinder 12 and piston 13 is controlled by means of a control valve 14 and a directional valve 15 in hydraulic fluid supply lines 16 and 17 which may be, for example, oil supply lines. The extruder 1 also includes an extrusion head 18 which extrudes a parison or tube 19 of plastic material. The extrusion head 18 is arranged to actuate a variable orifice extrusion die core 45. The extrusion head 18 is so located that the mold 20 which is to form the article, and, more particularly the mold halves 21 and 22 (see FIGS. 1, 2 and 3) are open as they pass on opposite sides of the extrusion head 18. When the mold 20 is in its plastic parison receiving position, mold half 21 moves toward the other mold half 22 to grip the parison 19 at two spaced points along its length as shown in FIGS. 2 and 3 and as will be explained in more detail hereinbelow.

As the mold halves 21 and 22 grip the parison 19, an air injection needle 38 passes through the parison 19 and once the mold halves 21 and 22 have completely closed and sealed the opposite ends of the parison 19, air, under pressure, is introduced into the parison 19. The parison material which is still soft from the extrusion process is then expanded and the exterior of the expanded tube assumes the shape of the cavity of the mold.

Figure 2:
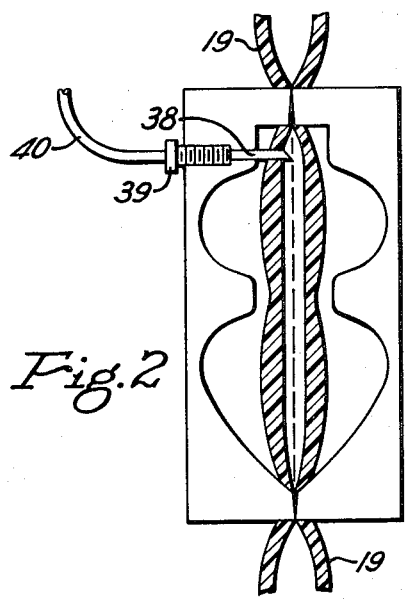
FIG. 2 is a cross-sectional view showing the initial relation of the mold with respect to the extruded plastic parison received from the extruder.
Figure 3:
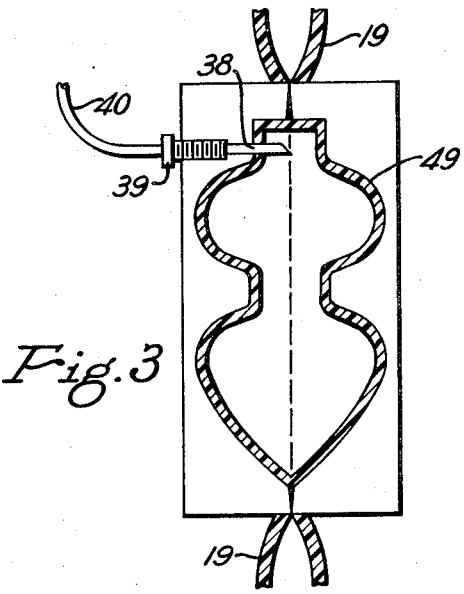
FIG. 3 is a cross-sectional view showing the parison after it has been expanded to conform to the configuration of the mold cavity.

Referring now to the specific construction of the mold 20 as shown in FIGS. 1, 2 and 3, there is included mold half 22 which includes an end wall 23 which is aligned with an end wall 24 of mold half 21. The end wall 23 of mold half 22 has a tapered edge 25 which is arranged to close against a tapered edge 26 of the end wall 24 of mold half 21. As the mold half 22 is caused to move toward and abut mold half 21, a section of the plastic parison 19 is clamped between the tapered edges 25 and 26, the result being that the plastic parison 19 is collapsed, sealed and severed at this point. The other or opposite end wall 27 of mold half 22 is aligned with the other or opposite end wall 28 of mold half 21. The end wall 27 has a tapered edge 29 which is arranged to close against a tapered edge 30 of the end wall 28. As the mold half 21 is caused to move towards and abut the mold half 21, the parison 19 is thus also clamped between the tapered edges 29 and 30 so as to collapse and seal the parison 19 at a second point along its length.

Mold halves 21 and 22 are actuated to move toward or away from each other by means of suitable driving means 161 such as, for example, hydraulic cylinders comprising cylinders 162 and pistons 163 actuated by a hydraulic fluid such as, for example, oil, supplied to said hydraulic cylinders 162 through flow lines 164 and 165 and directional valves 166.

As illustrated, the mold halves 21 and 22 include a cavity for the formation of a hollow bottle 49 (see FIG. 3). However, it is to be understood that a bottle is only one of many hollow articles which may be produced utilizing the apparatus and process of this invention. The mold cavity of the mold half 22, which is generally labeled 31, includes a body defining portion 31a and a neck defining portion 31b. The mold cavity of the mold half 21 is generally labeled 32 and includes a body defining portion 32a and a neck defining portion 32b. A needle 38 is carried by mold half 22 and extends into a portion of the cavity 32. The other end of the needle 38 is connected through a fitting 39 of an air line 40 to a suitable source of compressed air (not shown). When the mold half 22 cooperates with the mold half 21 to clamp and seal the plastic parison 19 therebetween, the needle 38 penetrates the plastic parison 19. Compressed air is next forced into the parison 19 between these two seals with the result that the parison 19 is internally expanded and forced into engagement with the outline of the mold cavities 31 and 32 as shown in FIG. 3.

As mentioned above, the portions of the parison 19 which undergo the greatest expansion to form the finished plastic article 49 normally would undergo the greatest thinning of the wall during molding process. Also it is often desirable that the lower wall and bottom portions of the finished article 49 be somewhat thicker and hence stronger than the upper wall portion of the finished article. Likewise, it may be desirable to strengthen other local portions of the wall such as where a handle is to be molded on the wall.

The details of the extrusion head 18 and the extrusion die core 45 will now be described in considerable detail. The extrusion head 18 includes a body or housing portion 41 shown in cross-section in FIG. 1. The body 41 has an inverted L-shaped passageway 43 formed therein, which passageway is arranged to have one leg 43a communicate through the extrusion head 18 to receive the plastified material 2 from the extruder 1. The other leg 43b of the passageway 43 leads into a variable orifice 44 which is generally of a circular configuration. An extrusion die core 45 is mounted in leg 43b of passageway 43. A parison 19 is formed primarily from the action of a die core 45, a die shell 46, a mandrel 47 and a core member 48. The mandrel 47 in the form of an elongated tubular member is affixed in extrusion head 18 by any suitable fixing means (not shown) to extend through the length of the leg 43b of passageway 43. The upper portion of the mandrel 47 is tightly received in a bore 41a formed in housing 41. The connection between the housing 41 and the upper portion of the mandrel 47 is sealed by any suitable gasket means (not shown).

When the mandrel 47 is moved, the extrusion die core 45 is likewise moved and effectively increases or decreases the size of the opening in orifice 44 to control the amount of plastified material 2 fed through or extruded through orifice 44 during any given period.

The die core 45 and the mandrel 47 may have an internal air passage in the form of a core 48 extending along their interior length, which core 48 receives air from any suitable air supply. Air may then be continuously forced through air passage core member 48 and into the parison 19 being extruded to maintain the parison 19 from collapsing inwardly.

It is to be noted that the interior of the die shell 46 and the exterior of the lower portion of the extrusion die core 45 are formed to produce the desired configuration of the plastified material to be extruded. In the embodiment shown in the drawings, the core pieces 45 and the die shell piece 46 shape the extrusion into the form of a tube.

Since the plastified material 2 forming the parison 19 passes around the end portion of the die core 45, the internal diameter of the parison 19 remains constant. However, the external diameter of the parison 19 is varied by moving the extrusion die core 45 to vary the opening of orifice 44 to permit more or less of the plastified material 2 to pass through the orifice 44 during any given period. Thus it will be apparent that should the extrusion die core 45 be moved upwardly, the effective cross-section of the orifice 44 would be increased in the case of a top closing die shown in the illustrated embodiment. The foregoing would result in the parison 19 having an increased wall thickness while retaining the same internal diameter. The wall thickness of the parison 19 may be changed during the extrusion process without stopping the extrusion process. The foregoing changes in wall thickness may be accomplished by continuing the extrusion of the plastified material while varying the position of the extrusion die core 45 and hence varying the opening of orifice 44. It will be apparent that the positioning of the die core 45 will be controlled by driving means 153 which is preferably a hydraulic cylinder 154 having associated therewith a piston 155. The controlling action of the driving means 153 is effectuated through hydraulic fluid supply lines 158 and 159, die core control valve 156 and directional valve 157. It is necessary that the control of the movement of the extrusion die core 45 and the opening of the orifice 44 be adjusted in timed relationship to the axial movement of the rotatable ram screw 6 so that the formation of the parison 19 from plastified material 2 is conducted under substantially constant rheological conditions in order to form suitable plastic articles of constant or variable wall cross-section. The feature of the invention will now be described hereinbelow.

The circuit for controlling the operation of control valves 14 and 156, which drive pistons 13 and 155 of hydraulic cylinders 12 and 154 respectively, and hence the control of the movement of the extrusion die core 45 and the axial movement of the moving ram screw 6 will now be described by reference to FIG. 6. FIG. 6 shows a programmable function generator 50 which comprises in essence a voltage divider matrix. A plurality of electrical lines or leads indicated generally by 51 and designated 51a through 51j are arranged to be connected to an impedance element 52 in the form of a resistor. Lines 51 are arranged in spaced electrical relation on resistor 52 to connect to different resistive values and thus to provide a voltage dividing function. In one embodiment of the invention a voltage of about 8.7 volts is impressed across the impedance element for resistor 52 through lines 54 and 55 from a suitable alternating current power source 53 and about ten electrical lines or leads 51a through 51j are connected to provide voltages at stepped .87 volt increments. In a preferred embodiment of the invention a polarity switch is provided in lines 54 and 55 to permit the use of the control circuitry of this invention with either top or bottom closing extrusion die cores as will be more fully set forth hereinafter.

A plurality of adjustably connectable electrical lines or leads indicated generally by 57 and designated as 57a through 57j are arranged to be selectively connected to lines or leads 51 by suitable movable terminators or pin connectors indicated by the arrows on the lines 57a through 57j. The lines 51 and 57 form a rectangular matrix configuration of horizontally and vertically positioned lines. The lines 57a through 57j are effectively movable to be selectively connected to lines 51 for purposes to be described. Any suitable function generator may be used in the apparatus of this invention; however, one such function generator found suitable for use with this invention is a function generator of the so-called Vernistat Adjustable Function Generator manufactured by the Veristat Division of the Perkin-Elmer Corporation. The lines 57a through 57j terminated in a rotary switch 58 that may be of any suitable known construction. Switch 58 comprises a plurality of spaced stationary terminals generally labeled 59 and designated as 59a through 59j and a rotatable rotor 60 on which there is mounted an electrical contact member 61. As the rotor 60 is caused to rotate, the contact 61 closes an electrical contact with each of the terminals 59a through 59j in stepped and timed sequence.

The rotatable rotor 60 of the rotary switch 58 is connected to a second rotary switch 121 and said rotatable rotor 60 is adapted to be driven in stepped and timed sequence with a rotatable rotor 122 associated with rotor switch 121 as more fully set forth hereinafter. Generally, rotatable rotors 60 and 122 are connected by any suitable connecting means 152 such as, for example, a simple mechanical connection, so as to be simultaneously driven in stepped and timed sequence. The rotatable rotor 60 of rotary switch 58 is electrically connected through lead 61a and an amplitude control potentiometer 62 to ground reference. A tap 63 on potentiometer 62 is connected through lines 64 and 65 to an AC servo controller 66 of any suitable known type arranged to provide a signal to drive the die core control valve 156 through lead 67. In a preferred embodiment of the system, lead 64 will have a relay switch 68 positioned therein to permit the control action of the AC servo controller 66 to function only during the extrusion step of the main molding cycle. The relay switch 68 is actuated by the main extruder cycle control (not shown) and is only actuated during the extrusion step. When the relay switch 68 is out, the deactivated input to the servo controller 66 is connected to ground. A suitable voltage is supplied across a bias control potentiometer 69. Bias control potentiometer 69 includes a tap 70 and a lead 71 from the bias control potentiometer 68 to servo controller 66 which provides a means for biasing the control system. This allows for equilibrium at any desired position of the movable extrusion die core 45.

A linear, variable differential transformer (LVDT) 76 is energized from any suitable current source through electrical lines 77 and 78 connected to a winding 76a of the LVDT. The other winding 76b of the LVDT 76 is connected to ground reference and through lead 79 to the AC servo controller 66. The LVDT 76 is connected to the AC servo controller 66 to provide a feedback signal for the extrusion die core control circuit. As the die core control valve 156 is actuated to drive the extrusion die core 45 up or down in the die shell 46 to correspondingly increased or decreased annular orifice opening 44, a movable core sensor 80 in LVDT 76 is correspondingly moved by contact with the upper end of the mandrel 47 of the extrusion die core 45. Movement of the core sensor 80 causes a voltage to be developed in the LVDT output in accordance with said movement, in a manner well known in the art. The voltage thus developed by the core sensor 80 is coupled through lead 79 to the AC servo controller 66 for comparison with the original input signal fed to the AC servo controller 66 by lead 65. The original signal and the feedback signal are compared to effect accurate positioning of the extrusion die core 45.

The speed at which the control action of the AC servo controller 66 takes place is controlled with a potentiometer 72 in electrical tap 73 off line 67. The gain control potentiometer 72 includes a tap 74 coupled to AC servo controller 66 by lead 75, thereby providing a means for adjusting the resistance of potentiometer 72 to thereby adjust the speed of response of the extrusion die core member 45 to the output of the AC servo controller 66 through lead 67.

A lead 81 off electrical line 65 supplies the AC output signal of the programmable function generator 50 as an input signal to a rectifier system comprising a voltage follower 82 energized from a suitable power source 85 through leads 86 and 87, a diode 84 and capacitor 83. The AC input signal is rectified and the resulting DC signal is lead through lead 88, having tap 89 with a resistor 90 to ground reference, to a squarer computer 91 having a power supply through leads 92 and 93 and a reference voltage through leads 94 and 95 from a reference voltage supply 96. Any suitable squaring computer having a squaring module and two coefficient modules such as those supplied by the Devar Kinetics Division of Consolidated Electrodynamics Corporation, may be employed in the apparatus of this invention. A square DC signal is supplied from the squaring computer 91 and is attenuated proportionally to a desired shear rate by a ten-turn potentiometer 97 having a tap 98 and lead 99 connected to the square computer 91 and its output lead 100. The attenuated squared DC signal from the computer 91 is supplied as an input to a DC servo controller 101 of any known type by electrical lead 100 in order to provide an output signal through lead 102 to drive the ram screw axial movement speed control valve 14.

A tachometer 104 produces a signal proportional to the ram screw axial movement speed through lead 105, ratio potentiometer 106 having tap 107, and lead 108 connected to the DC servo controller 101 to provide a feedback signal for the ram screw axial movement control circuit. Axial movement of the ram screw 6 causes a voltage to develop in tachometer 104 in accordance with said movement in a manner well known in the art. The voltage developed through tachometer 104 is coupled through lead 105 and attenuated proportional to a die constant as explained later in potentiometer 106 and then fed back to DC servo controller 101 through electrical lead 108 for compariosn with the original input signal feed to the DC servo controller 101 through lead 100. The original input signal and the feedback signal are compared to effect accurate movement of the ram screw 6.

In a preferred embodiment of this invention the control system lead 100 will have a time delay relay 103 positioned therein to compensate for delays in the movement of the ram screw 6 due to the inertia of the resting ram screw 6 and other delays inherent in a hydraulically controlled system. If, during this time, a high input signal were fed to the DC servo controller 101 through lead 100, it would sense a large difference and it would cause the ram screw axial movement speed control valve 14 to open completely asking for maximum speed. The time delay relay 103 prevents this situation and lets the input signal pass to the DC servo controller 101 only after a certain variable time during which the ram screw movement has begun due to a constant leakage of the control valve 14 in the zero position. Delay times of form about 0.5 to about 5 seconds, preferably from 1 to 2 seconds, are generally employed. After that the speed will quickly respond to the input signal without overshoot.

A voltage is supplied across a series of a plurality of photocells indicated generally by 112 and designated as 112a through 112j from a suitable power source (not shown) by means of main electrical leads 110 and 111 and a series of branch leads indicated generally by 113 and designated as 113a through 113j connected to the series of photocells 112. Photocells 112 are supplied with outgoing leads 114a through 114j having taps 115a–a' through 115j–j' respectively, adapted to receive the terminal leads 117 and 118 of a selector switch 116 for a purpose to be set forth hereinafter. Connected to taps 115a' through 115j', respectively, are leads 119a through 119j terminating in contact points indicated generally by 120 and designated 120a through 120j representing contacts of a stepping relay 121 that may be of any suitable construction.

Stepping relay 121 comprises a plurality of space stationary contact terminals, generally labeled 120 and designated 120a through 120j, and a rotatable rotor 122 on which is mounted an electrical contact member 123. As is known, as the rotor 122 is caused to rotate, the contact member 123 positions an electrical contact with each of the terminals 120a through 120j in stepped and timed sequence. The rotor 122 of stepping relay 121 is electrically connected through lead 124 to a transistor 109 and coil 128. Transistor 109 and coil 128 form a transistor-relay circuit 129 with amplitude control potentiometer 125, lead 127 and switch 130. Coil 128 is electrically connected by lead 131 to power supply lead 110. Transistor lead 127 is connected to ground reference by line 132. Terminal lead 118 of selector switch 116 is electrically connected to a transistor 136 and coil 137 which forms a second transistor-relay circuit 138 with an amplitude control potentiometer 134, lead 135 and switches 139 and 140. Coil 137 is electrically connected to power supply lead 110 through lead 141. Terminal lead 117 of selector switch 116 is connected to power supply lead 110 through resistor 142. A suitable voltage from a power source (not shown) is supplied by lead 143 across switch 139 to either (a) lead 144 and thence to reset coil 145 for rotor 122 of rotary switch 121 when switch 139 is in position 139a, or (b) to lead 147 and thence to switch 130, which switch 130 has a normally opened contact 130a and a normally closed contact 130b. Contact 130b is connected by lead 148 to stepper coil 149 when switch 139 is in position 139b. A suitable voltage from a power source (not shown) is supplied by lead 160 across switch 140 through either (a) lead 150 and thence to the main cycle controller (not shown) when switch 140 is in position 140a or (b) through lead 151 to any suitable indicator 146 such as, for example, a light, when switch 140 is in position 140b.

Referring now to the operation of the apparatus of FIG. 1 and the circuit of FIG. 6, a suitable extrusion grade plastic material such as, for example, polycarbonate, polyethylene, polystyrene, polyurethane or the like, or any other suitable plastic material capable of extrusion is fed to an extruder 1 through feed means 7 and is plastified in a barrel section 4 by the rotating screw 6 of heated extruder 1. Where the die core 45 is closed with respect to the orifice 44, the pumping action of the screw 6 fills the cavity 43 between the screw and die with molten plastic material 2 which simultaneously pushes the screw 6 backwards. To extrude the parison 19, the screw rotation is stopped, the die core 45 is opened and the screw-gear box-motor assembly 6, 8 and 9 are moved forward by the ram 10 actuated by driving means 11. The parison 19 is extruded between the mold halves 21 and 22 and when a parison 19 has been extruded between the entire length of the two mold halves 21 and 22, the mold halves are moved toward each other to grip the parison 19 at two spaced points along its length and an injection needle 38 passes through the parison 19. Alternatively, a blowpipe in the die core may extend into the parison. When the mold halves 21 and 22 have completely sealed the opposite ends of the parison 19, air under pressure is introduced into the parison 19 and the parison is expanded to assume the shape of the cavity of the mold.

The filling of the extruder barrel 4 with plastic material 2, the plastifying of the plastic material 2, the pumping action of the screw 6 to fill the cavity 43 between the screw 6 and the die core 45, the extrusion of the parison 19, the closing and clamping of the mold halves 21 and 22, the blowing of air into the mold 3, the opening of the mold 3, and stripping of the blown article 49 from the mold 3 are controlled by a main cycle controller (not shown) of a type generally known to those skilled in the art.

Assume that an AC power source 53 supplies an 8.7 volt AC voltage through input lines 54 and 55 and through polarity switch 56 to the plurality of vertical leads 51a through 51j of function generator 50 through resistor 52 thereby providing a voltage dividing function whereby the leads 51a through 51j are connected to provide voltages in stepped .87 volt increments. Assume also that the horizontal leads 57a through 57j have been selectively positioned, that is, programmed to contact selected vertical leads 51 of the function generator 50 in accordance with the thickness of the parison walls desired on each specific portion of the article 49 being molded. The horizontal leads 57a through 57j are selectively positioned by setting the terminal pins of lead 57 in the board of the Vernistat Adjustable Function Generator. Each of leads 57a through 57j controls the thickness of a certain portion of an article wall as more fully explained later. For example, the setting or programming of the function generator as shown in FIG. 6 corresponds to the parison required to blow mold an article like article 49 with a substantially constant wall thickness after blowing of the parison 19.

It is to be appreciated that the function generator 50 actually controls the thickness of a discrete portion of the walls of an extruded parison 19 as shown in FIGS. 1, 2 and 3, which parison is then expanded to form a blown article 49 with walls of the desired thickness. The wall thickness of the article over its entire length is thus entirely programmed by the setting of the terminal pins of horizontal leads 57a through 57j.

To obtain sequential activation of the horizontal leads 57a through 57j, a plurality of photocells 112a through 112j are suitably mounted in front of the extrusion space between mold halves 21 and 22. The photocells 112 are activated by the light from a light source. Preferably the photocells 112 are activated by the light of a fluorescent tube mounted next to the photocells. The light from the fluorescent tube shines into the extrusion space and is reflected to the photocells by a mirror placed in back of the extrusion space. The dropping parison sequentially interrupts the light to the photocells 112 and the photocells are thereby sequentially deactivated. The plurality of photocells 112 may be of any suitable number, preferably about ten, and are generally positioned at points corresponding to points at which a change in wall thickness of the parison vis-a-vis the mold are desired. A suitable DC voltage such as, for example, 30 volts, is supplied to the photocells 112 from a power supply through leads 110, 111 and 113a through 113j. When the photocells are not deactivated by the dropping parison, the voltage is transmitted through the photocells in the following manner; the voltage is conducted through photocell 112a to lead 114a to tap 115a–115a' and then through lead 119a and so forth for each of the corresponding photocells 112b through 112j, leads 114b through 114j, taps 115b–b' through 115j–j' and leads 119b through 119j, respectively. Electrical contact member 123 of relay switch 121 sequentially picks up the voltage from each of contact points 120a through 120j associated with lead 119a through 120j associated with leads 119a through 119j respectively. From relay switch 121 the voltage is transmitted to transistor relay circuit 129.

During the extrusion step of the main cycle, a suitable voltage is supplied from a power source (not shown) through lead 143 across switch 139, through switch position 139b and lead 147 to switch 130 in switch position 130a.

When extrusion of the parison 19 starts, contact member 123 of relay switch 121 is in its initial starting position wherein its is picking up a voltage from the initial contact point 120a through the first or top photocell 112a. At the same time contact member 61 of rotary switch 58 is also positioned in its initial starting position wherein it is contacting initial lead 57a and is picking up a programmed voltage from function generator 50 and one of the vertical lead 51, in this instance, vertical lead 51b, through electrical lead 57a. With the foregoing connection of lead 57a to lead 51b, the voltage from the function generator 50 is applied through lead 61a, potentiometer 62, tap 63, lead 64, relay switch 68, which is closed only during the extrusion step, and lead 65 to the AC servo controller 66. The AC servo controller 66 is arranged to provide a signal through lead 67 to drive the extrusion die core control valve 156 to thereby position the die core 45 to obtain the correct position corresponding to the desired parison wall thickness. As the die core 45 is positioned in response to the output signal 67 of the AC servo controller 66, the movement of the mandrel 47 of the die core 45 causes a corresponding movement in die core sensor 80 by contact of it with the mandrel 47. As a result, movement of the core sensor 80 causes a voltage to be developed in transformer 76 in accordance with said movement. The voltage thus developed by the core sensor 80 is coupled through lead 79 to AC servo controller 66 for comparison with the original input signal fed to it through lead 65. The original input and feedback signals are compared to effect accurate positioning of the die core 45.

Lead 81 supplies the AC output voltage signal of the programmable functional generator 50 and electrical line 57a as an input signal to a rectifier system 82, 83 and 84 where the AC signal is rectified and the resulting DC signal is led through lead 88 to squarer computer 91. As previously stated, when different wall thicknesses are extruded through a die with diffeernt annular openings, it is desirable that the speed of extrusion be regulated. The characteristic that should be kept constant is the shear rate of the plastic material in the narrowest part of the die opening. In order that the shear rate may be kept constant, the DC input signal fed to the squarer computer 91 must be squared and attenuated in the computer 91 according to the formulas developed below.

Figure 4:
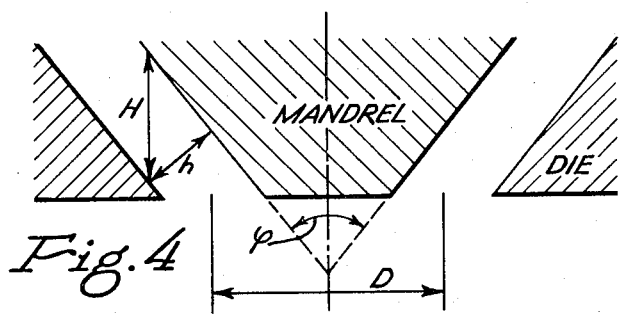
FIG. 4 is a cross-sectional view of a die core opening.
Figure 5:
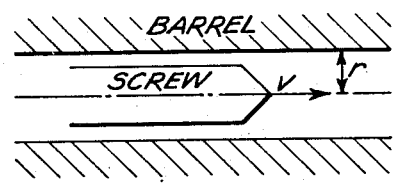
FIG. 5 is a cross-sectional view of a portion of an extruder.

Referring now to FIGS. 4 and 5 wherein for a bottom closing die, H is the vertical displacement of the die core as measured by the LVDT, $\alpha$ is the die angle, $h$ is the annular opening, D is the mean diameter of the die, Q is the volumetric extrusion rate, $v$ is the ram speed, $r$ is the radius of the barrel and $\gamma$ is the shear rate. The volumetric extrusion rate Q equals $v\pi r^2$ and since the shear rate $\gamma$ equals $$\frac{5.58Q}{\pi D h^2}$$

the shear rate formulas may be simplified to the formula $$\gamma = \frac{5.58 v \pi r^2}{\pi D H^2 \sin^2 \alpha}$$

and to $$v = \gamma \left( \frac{D \sin^2 \rho}{5.58 r^2} \right) H^2$$

Since the quantity between the brackets is an apparatus constant depending on the extruder barrel and the die used, the formulas further simplify to $$v = \gamma K H^2$$

Thus, in order to keep a constant shear rate $\gamma$ the ram speed must be regulated proportionally to the square of the die core displacement H.

Therefore, the DC input signal is fed through lead 88 to the squarer computer 91 where the signal is squared and the squared signal is attenuated proportionally to the desired shear rate. The squared attenuated signal is then fed directly as an input signal through lead 100 and time delay relay switch 103 to DC servo controller 101 arranged to provide an output signal through lead 102 to drive the ram screw axial movement speed control valve 14 to thereby control the axial movement of the ram screw 6 so as to maintain a substantially constant shear rate. As the axial movement of the ram screw 6 is controlled in response to the ouput signal of the DC servo controller 101, the actual speed of the ram screw 6 is measured by tachometer 104 and the signal developed in the tachometer is coupled through lead 105, potentiometer 106, tap 107 and lead 108 to the DC servo controller 101 as a feedback signal for comparison with the original input signal fed to the DC servo controller 101 by lead 100. The original input and feedback signals are compared to effect accurate adjustment of the speed of the ram screw 6. Potentiometer 106 attenuates the tachometer signal proportionally to the die constants described above before feeding the tachometer signal back to the DC controller 101. By the control circuitry of this invention, the computer 91 receives as an input signal through lead 88 the same signal as the die opening servo controller 66, so instead of the actual momentary die opening, the input signal for the die opening servo controller 66 is taken to govern the speed of extrusion as determined by the ram screw speed.

Time delay relay 103 is provided in lead 100 for the purpose heretofore described and to substantially eliminate overshoot.

As the die core 45 and the ram screw 6 are being positioned in response to the signals generated through lead 57a of function generator 50, the parison 19 is being extruded at a substantially constant shear rate and at the programmed wall thickness. The parison 19 is extruded downwardly from the die core 45 and the dropping parison 19 will eventually interrupt the light to the first photocell 112a in the series of photocells. When the light supply to photocell 112a is cut off by the dropping parison, photocell 112a becomes nonconducting as a result of which the voltage supply to transistor relay circuit 129 is terminated plate coil 128 repositions switch 130 from position 130a to 130b. By this action a voltage supply is fed from lead 143, switch 139 in position 139b, lead 147, switch 130 in position 130b and lead 148, to actuate stepper coil 149, thereby repositioning relay switch contact member 123 to make contact with contact point 120b, thereby drawing the voltage from still actuated photocell 112b through lead 114b, tap 115b–b' and lead 119b. Simultaneously and in stepped sequence, contact member 61 of rotary switch 58 is repositioned to contact lead 57b to pick up the next programmed voltage from the function generator 50. This is done by having the terminal pin of lead 57b make contact with vertical line 51c. In the same manner as previously described, the output voltage from the function generator 50 provides a revised input signal to DC servo controller 66 through lead 57b, contact member 61, lead 61a, potentiometer 62, tap 63, lead 64 and lead 65. AC servo controller 66 thereby provides a revised output control signal through lead 67 to reposition die core 45 while at the same time the revised output voltage of the function generator 50 is also supplied through lead 81 then rectified, squared and attenuated proportionally to the desired shear rate to provide a revised input signal to DC servo controller 101 and thereby provide a revised output control signal through lead 102 to readjust the speed of the ram screw and thus readjust the extrusion speed such that extrusion at a substantially constant shear rate is maintained even though the die core 45 has been repositioned to provide a different wall thickness in the parison 19.

The control system continues to function in an identical manner with the dropping parison 19 sequentially deactivating each next photocell in the series of photocells so that the stepping coil 149 is actuated to switch the contact member 123 of stepping switch 121 to each next conducting photocell-transistor-relay circuit and at the same time causing switching of contact member 61 of relay switch 58 to the next programmed voltage in the corresponding next electrical lead 57. In this manner, the dropping parison 19 sequentially provides the desired programmed output signal from the function generator 50 through electrical leads 57a through 57j by sequentially deactivating each photocell in the series of photocells, thereby bringing the next photocell-transistor-relay circuit into functioning operation. As an additional and preferred feature of this invention, any one of the photocells 112a through 112j in the series of photocells may be selected to terminate the extrusion of the parison 19 simply by connecting the leads 117 and 118 of the selector switch 116 to the corresponding taps 115a–a' through 115j–j' of the selected photocell. Merely for purposes of exemplification, the last photocell 112j has been selected to terminate the extrusion step. It is to be appreciated, however, that any one of the photocells may be selected to terminate the extrusion step and this may be done by merely connecting the selector switch leads 117 and 118 to the appropriate taps of the selected photocell.

When the dropping parison 19 sequentially deactivates the selected photocell 112j such that the voltage to the transistor relay circuit 138 and to plate coil 137 is terminated, switch 139, which was in position 139b when coil 137 was conducting, is switched to position 139a so that the voltage from lead 143 is coupled through lead 144 to reset coil 145, thereby resetting relay switch 121 and thus switch 58 to their initial position, while at the same time and also as a result of coil 137 becoming non-conducting, switch 140, which was in position 140b when coil 137 was conducting, is switched to position 140a and thus a voltage from lead 160 is supplied through lead 150 to a feed signal to the main cycle control to terminate the extrusion step. Upon termination of the extrusion step, the mold halves 21 and 22 are then closed as previously described and the desired article 49 is blow molded from the parison 19 with the programmed wall thickness also in the manner previously described.

By the use of the selector switch 116 it is possible to select any one of the photocells to end the extrusion. Thus, in the case of a non-blow-molding grade of plastic material with appreciable sag, a photocell can be chosen above the lower level of the mold and thus the amount of sag occurring during the period between the end of the extrusion and closure of the mold can be anticipated and allowed for. It is therefore possible, with the apparatus of this invention, to blow mold articles from both nonsagging and sagging type plastic material without appreciable waste or loss of material.

Once an acceptable wall thickness has been programmed by the positioning of the pins or connectors on electrical leads 57a through 57j, ratio potentiometer 62 permits the whole voltage level of all the leads 57a through 57j to be proportionally reduced, thereby permitting a proportional reduction in the wall thickness for each programmed section of the article to be blown without changing the relative thickness of the programmed sections.

The bias control potentiometer 69 and gain control potentiometer 72 may be employed as previously described to set the zero point of the die core control system and to control the speed with which the die core 45 goes from one position to another when the input signal is changed, respectively. The gain control thus permits a smooth transition from one programmed parison wall thickness to the next programmed parison wall thickness rather than a stepwise change from one to the other. The function generator 50 may be programmed for any desired article shape. Programming merely requires a setting of the terminal pins or connectors of leads 57a through 57j such that the terminal pins or connectors make contact with the desired vertical leads 51.

The control circuit of this invention may be used with either top or bottom closing die cores since the polarity switch 56 functions to reverse the leads from AC power source 53 to the function generator 50. This changes the phase relationship between the servo controller 66 input signal and the feedback signal from the LVDT 76 to the servo controller 66. The effect is that in one position of the polarity switch 56 the die core 45 goes upward when a higher input voltage is supplied, whereas in the other position of the polarity switch 56 the die core 45 goes downward. The polarity switch 56 is thus set depending on whether a top or bottom closing die core is used.

Figure 7:
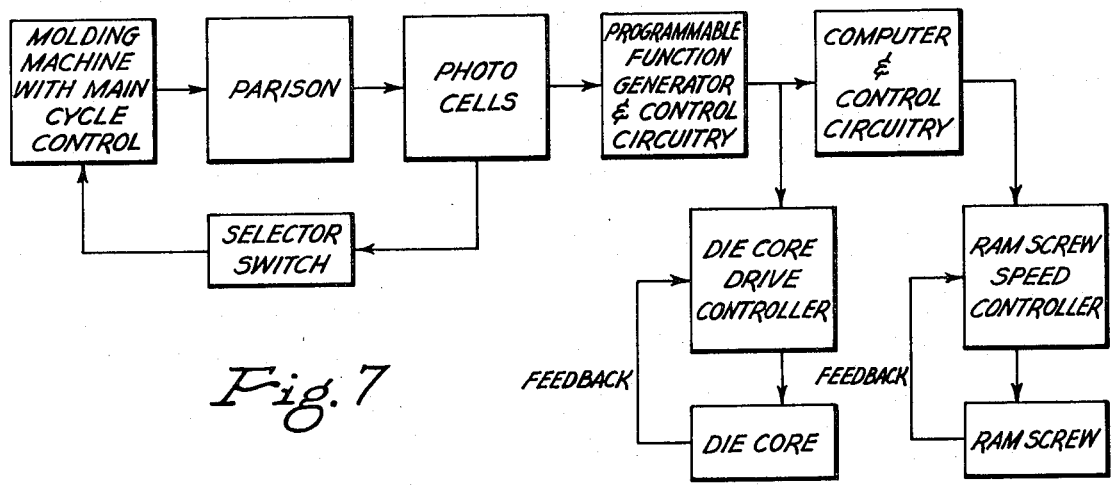
FIG. 7 is a block diagram showing the operation of the various components of the control circuit of this invention.

The operative relation of the control circuitry of FIG. 6 with respect to the other units of the over-all system is shown in FIG. 7. The molding machine as it operates extrudes a parison which sequentially deactivates a plurality of photocells. The sequential deactivation of the photocells by the dropping parison sequentially provides a programmed series of selected output signals from the programmable function generator which output signals are fed to a die core drive controlled to effect positioning of the die core and also to a squarer computer where the output signal is squared and attenuated proportional to the desired shear rate in order to provide an output control signal to the ram screw speed controller to effect control of the rate of extrusion. Feedback signals are provided for both the die core drive controller and the ram screw speed controller to provide the proper control signals. A selector switch is connected to a selected photocell to permit termination of the operation of the molding machine and thereby terminate the extrusion step by means of the dropping parison.

The control apparatus of this invention has many advantages over the heretofore proposed control systems. For example, the control apparatus of the present invention permits wall thickness and control over the entire length of the parison an dalso permits simultaneous control of the speed of extrusion such that extrusion takes place under substantially constant rheological conditions. Additionally, changes in the parison configuration may be readily made without interruption of the cycling of the blow molder merely by repositioning of the pins of electrical lead 57a through 57j. By the use of the dropping parison itself to sequentially deactivate the series of photocells, the control is generated at the desired time. The use of a photocell to terminate the extrusion permits control of the length of the parison, thus minimizing wasted material due to overlength of the extruded parison. An additional benefit of the control apparatus of this invention is that it permits the processing of both sagging and non-sagging types of extrusion grade plastic material.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention.

What is claimed is:

1. In a method of blow molding hollow shaped plastic articles wherein the axial movement of a rotatable ram screw extrudes a molten thermoplastic material through a variable orifice having associated therewith a movable and positionable die core to form a downwardly moving hollow parison of said molten thermoplastic material, said parison having a variable wall thickness along its length, and wherein said parison is thereafter clamped between two mold halves and blow molded into said plastic article, the improvement comprising:
  (a) extruding said thermoplastic material through said variable orifice to form said downwardly moving parison,
  (b) sequentially deactivating by means of said downwardly moving parison, a plurality of means responsive to said parison movement,
  (c) in response to (b), sequentially activating a thickness control unit to displace said movable die core relative to said orifice to achieve predetermined wall thicknesses of said parison, and
  (d) in response to (c), sequentially activating an axial ram speed control unit to vary the axial movement speed of said ram screw proportionally to said die core displacement in order to maintain a constant shear rate of said thermoplastic material.

2. The method of claim 1 wherein the means responsive to said parison movement is a plurality of photocells.

3. The method of claim 1 which includes the additional step of activating a control unit to terminate the parison extrusion in response to the bottom portion of said parison reaching a predetermined point and in turn deactivating one of said means responsive to said parison movement.

References Cited

UNITED STATES PATENTS

| | | | |
|---|---|---|---|
| 3,012,286 | 12/1961 | Gasmire | 264—Dig. 33 |
| 3,329,752 | 7/1967 | Heider et al. | 264—98 X |
| 3,335,457 | 8/1967 | Martin, Jr. | 264—98 X |
| 3,343,210 | 9/1967 | Guignard | 264—98 X |
| 3,436,443 | 4/1969 | Hutchinson | 18—5 BC X |

FOREIGN PATENTS

| | | | |
|---|---|---|---|
| 5,975 | 1963 | Japan | 18—5 BC |
| 1,196,353 | 7/1965 | Germany | 264—98 |

ROBERT F. WHITE, Primary Examiner

J. H. SILBAUGH, Assistant Examiner

U.S. Cl. X.R.

264—98, Dig. 33; 425—140, 145, Dig. 203 C

UNITED STATES PATENT OFFICE
CERTIFICATE OF CORRECTION

PATENT NO. : 3,795,719

DATED : March 5, 1974

INVENTOR(S) : Andrew S. Morecroft; Simon A.D. Visser; Frank J. Limbert
(deceased)

It is certified that error appears in the above-identified patent and that said Letters Patent are hereby corrected as shown below:

Column 1, lines 6-8 should be corrected to indicate the assignment of the invention to Baychem Corporation is complete on behalf of all of the inventors by deletion of "said Limbert and said Visser" before "assignors to Baychem Corporation";

same column, lines 28 and 29, correct the title to read --Method of Controlling the Blow Molding of Hollow Shaped Plastic Articles--;

Column 4, line 4, delete the comma after "drawings";

Column 6, line 73, insert a period after "struction";

Column 7, line 8, after "associated with" correct "rotor" to --rotary--;

Column 12, line 42, insert --The-- before "AC servo";

Column 14, line 22 "an dalso" should be corrected to --and also--.

Signed and Sealed this

Thirty-first Day of August 1976

[SEAL]

Attest:

RUTH C. MASON
*Attesting Officer*

C. MARSHALL DANN
*Commissioner of Patents and Trademarks*